(12) United States Patent
Zhao et al.

(10) Patent No.: US 11,468,521 B2
(45) Date of Patent: Oct. 11, 2022

(54) SOCIAL MEDIA ACCOUNT FILTERING METHOD AND APPARATUS

(71) Applicant: Tencent Technology (Shenzhen) Company Limited, Shenzhen (CN)

(72) Inventors: Pengpeng Zhao, Shenzhen (CN); Zhiyong Wu, Shenzhen (CN); Yongkun Li, Shenzhen (CN); Jun Yin, Shenzhen (CN); Dafu Deng, Shenzhen (CN); Longjun Sun, Shenzhen (CN); Juhong Wang, Shenzhen (CN); Wei Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 565 days.

(21) Appl. No.: 16/293,109

(22) Filed: Mar. 5, 2019

(65) Prior Publication Data
US 2019/0197633 A1 Jun. 27, 2019

Related U.S. Application Data

(63) Continuation of application No. PCT/CN2017/108564, filed on Oct. 31, 2017.

(30) Foreign Application Priority Data

Oct. 31, 2016 (CN) .......................... 201610972499.1

(51) Int. Cl.
*G06F 16/00* (2019.01)
*G06Q 50/00* (2012.01)
(Continued)

(52) U.S. Cl.
CPC ............. *G06Q 50/01* (2013.01); *G06F 16/00* (2019.01); *G06F 16/9024* (2019.01); *G06F 16/9535* (2019.01); *H04L 67/22* (2013.01)

(58) Field of Classification Search
CPC ..... H04L 67/22; G06F 16/9024; G06F 16/00; G06F 16/9535; G06Q 50/01
See application file for complete search history.

(56) References Cited

U.S. PATENT DOCUMENTS 9,367,879 B2 6/2016 Borgs et al.
2012/0324027 A1* 12/2012 Vaynblat ............ G06Q 30/0271
709/206
(Continued)

FOREIGN PATENT DOCUMENTS

CN 103020116 A 4/2013
CN 103024017 A 4/2013
(Continued)

OTHER PUBLICATIONS

Search Report received for PCT Application No. PCT/CN2017/108564 dated Dec. 22, 2017 (Chinese language only) (8 pp.).
(Continued)

*Primary Examiner* — Allen S Lin
(74) *Attorney, Agent, or Firm* — Crowell & Moring LLP

(57) ABSTRACT

This disclosure relates to an account filtering method and apparatus. The method includes obtaining user accounts of a social activity network and user activity information; constructing a hypergraph of the social activity network comprising nodes and hyperedges according to the user accounts and the user activity information, wherein a node in the hypergraph comprises the user account in the social activity network, and a hyperedge in the hypergraph comprises a set of user accounts that participates in a user activity of an activity type, or a friendship relation between one user account and another user account; for each node in the hypergraph, calculating a probability that another node of the hypergraph would walk to the node when performing a random walk along the hyperedge in the hypergraph, and obtaining an influence value of the node in the social activity
(Continued)

network according to the probability; and sequentially filtering nodes of the hypergraph to obtain a sequence of nodes having a maximum influence by using an iteration algorithm, to form a seed node set.

12 Claims, 7 Drawing Sheets

(51) Int. Cl.
*G06F 16/9535* (2019.01)
*G06F 16/901* (2019.01)
*H04L 67/50* (2022.01)

(56) References Cited

U.S. PATENT DOCUMENTS

| | | |
|---|---|---|
| 2014/0089400 A1 | 3/2014 | Yan et al. |
| 2014/0095689 A1* | 4/2014 | Borgs ..................... G06Q 30/02 709/224 |
| 2014/0194208 A1* | 7/2014 | Splaine .................. G06Q 30/02 463/42 |
| 2017/0075908 A1* | 3/2017 | Mitra ...................... G06F 16/78 |

FOREIGN PATENT DOCUMENTS

| | | |
|---|---|---|
| CN | 103116611 A | 5/2013 |
| CN | 103379158 A | 10/2013 |
| CN | 105117422 A | 12/2015 |
| CN | 105488247 A | 4/2016 |
| CN | 105608194 A | 5/2016 |
| CN | 105913159 A | 8/2016 |

OTHER PUBLICATIONS

Office Action dated Apr. 17, 2020 for Chinese Application No. 201611069792.3 with concise English Translation, 6 pages.

* cited by examiner

SOCIAL MEDIA ACCOUNT FILTERING METHOD AND APPARATUS

RELATED APPLICATION

This application claims priority to International PCT Application No. PCT/CN2017/108564, filed with Chinese Patent Office on Oct. 31, 2017 and entitled "Account Filtering Method and Apparatus", which claims priority to Chinese Patent Application No. 201610972499.1, filed with the Chinese Patent Office on Oct. 31, 2016 and entitled "SEED NODE FILTERING METHOD AND APPARATUS IN SOCIAL ACTIVITY NETWORK", which are incorporated herein by reference in their entireties.

FIELD OF THE TECHNOLOGY

This disclosure relates to the field of computer applications for social media network, and in particular, to a user account filtering method and apparatus.

BACKGROUND OF THE DISCLOSURE

With rapid development of the network technologies, it becomes more frequently for a user to participate in social activities through social networks. For different users, different social influences are generated because of differences between their social standings, positions, or the like. Determining a user set having a predetermined number of users (number of seeds) from a collection of users with a maximum social influence under the same influence spread mode has been a classic problem that plays an important role for commercial promotion.

SUMMARY

Embodiments of this disclosure provide a method and apparatus for filtering social media user accounts with improved accuracy, with user activity in a social network being considered.

An account filtering method is provided, including:

obtaining a parameter set representing a social activity network, the parameter set including an account set, an activity set, a relationship set between accounts, and a relationship set between accounts and activities;

constructing a hypergraph of the social activity network according to the parameter set, and obtaining an activity type hyperedge set in the hypergraph, a set consisting of all accounts in a hyperedge except the particular account, a hyperedge set corresponding to types of activities that the particular account participates in, a proportional influence of activities to the particular account, and a friend set of the particular account, a vertex of the hypergraph being an account, and one hyperedge in the hypergraph being a set of accounts that participate in an activity of an activity type, or representing a friendship between one account and another account;

obtaining a proportional influence of friends to the particular account according to the proportional influence of activities to the particular account, and obtaining a transition probability of a node performing a random walk in the hypergraph, according to the proportional influence of friends to the particular account, the friend set of the particular account, the proportional influence of activities to the particular account and the set consisting of all accounts in the hyperedge except the particular account and the hyperedge set corresponding to the types of the activities that the particular account participates in;

obtaining a candidate node set and an influence of the candidate node set, including: obtaining a total influence variable of an account, and estimating an influence value of the candidate node set according to the total influence variable of the account, a transition probability between nodes in the remaining account sets obtained by subtracting the candidate node set from the account set, and a transition probability from a node in the remaining account sets to a node in the candidate node set; and obtaining a candidate node set having a maximum influence value through iteratively estimation, and using the candidate node set having the maximum influence value as a seed node set.

An account filtering apparatus is provided, including: a processor and a memory, and the memory storing a computer readable instruction that causes the processor to execute the following operations:

obtaining a parameter set representing a social activity network, the parameter set including an account set, an activity set, a relationship set between accounts, and a relationship set between accounts and activities;

constructing a hypergraph of the social activity network according to the parameter set, and obtaining an activity type hyperedge set in the hypergraph, a set consisting of all accounts in a hyperedge except the particular account, a hyperedge set corresponding to types of activities that the particular account participates in, a proportional influence of activities to the particular account, and a friend set of the particular account, a vertex of the hypergraph being an account, and one hyperedge in the hypergraph being a set of accounts that participate in an activity of an activity type, or representing a friendship between one account and another account;

obtaining a proportional influence of friends to the particular account according to the proportional influence of activities to the particular account, and obtaining a transition probability of a node performing a random walk in the hypergraph, according to the proportional influence of friends to the particular account, the friend set of the particular account, the proportional influence of activities to the particular account and the set consisting of all accounts in the hyperedge except the particular account and the hyperedge set corresponding to the types of the activities that the particular account participates in;

obtaining a candidate node set and an influence of the candidate node set, including: obtaining a total influence variable of an account, and estimating an influence value of the candidate node set according to the total influence variable of the account, a transition probability between nodes in the remaining account sets obtained by subtracting the candidate node set from the account set, and a transition probability from a node in the remaining account sets to a node in the candidate node set; and obtaining a candidate node set having a maximum influence value through iteratively estimation, and using the candidate node set having the maximum influence value as a seed node set.

An account filtering method is provided, being applied to an electronic device, the electronic device including a processor and a memory, the memory storing a computer readable instruction, and the computer readable instruction being executed by the processor to implement the following operations according to the account filtering method:

obtaining a parameter set representing a social activity network, the parameter set including an account set, an activity set, a relationship set between accounts, and a relationship set between accounts and activities;

constructing a hypergraph of the social activity network according to the parameter set, and obtaining an activity type hyperedge set in the hypergraph, a set consisting of all accounts in a hyperedge except the particular account, a hyperedge set corresponding to types of activities that the particular account participates in, a proportional influence of activities to the particular account, and a friend set of the particular account, a vertex of the hypergraph being an account, and one hyperedge in the hypergraph being a set of accounts that participate in an activity of an activity type, or representing a friendship between one account and another account;

obtaining a proportional influence of friends to the particular account according to the proportional influence of activities to the particular account, and obtaining a transition probability of a node performing a random walk in the hypergraph, according to the proportional influence of friends to the particular account, the friend set of the particular account, the proportional influence of activities to the particular account and the set consisting of all accounts in the hyperedge except the particular account and the hyperedge set corresponding to the types of the activities that the particular account participates in;

obtaining a candidate node set and an influence of the candidate node set, including:

obtaining a total influence variable of an account, and estimating an influence value of the candidate node set according to the total influence variable of the account, a transition probability between nodes in the remaining account sets obtained by subtracting the candidate node set from the account set, and a transition probability from a node in the remaining account sets to a node in the candidate node set; and obtaining a candidate node set having a maximum influence value through iteratively estimation, and using the candidate node set having the maximum influence value as a seed node set.

A non-volatile storage medium is provided, storing a computer readable instruction, and the computer readable instruction being capable of being executed by a processor to:

obtaining a parameter set representing a social activity network, the parameter set including an account set, an activity set, a relationship set between accounts, and a relationship set between accounts and activities;

constructing a hypergraph of the social activity network according to the parameter set, and obtaining an activity type hyperedge set in the hypergraph, a set consisting of all accounts in a hyperedge except the particular account, a hyperedge set corresponding to types of activities that the particular account participates in, a proportional influence of activities to the particular account, and a friend set of the particular account, a vertex of the hypergraph being an account, and one hyperedge in the hypergraph being a set of accounts that participate in an activity of an activity type, or representing a friendship between one account and another account;

obtaining a proportional influence of friends to the particular account according to the proportional influence of activities to the particular account, and obtaining a transition probability of a node performing a random walk in the hypergraph, according to the proportional influence of friends to the particular account, the friend set of the particular account, the proportional influence of activities to the particular account and the set consisting of all accounts in the hyperedge except the particular account and the hyperedge set corresponding to the types of the activities that the particular account participates in;

obtaining a candidate node set and an influence of the candidate node set, including: obtaining a total influence variable of an account, and estimating an influence value of the candidate node set according to the total influence variable of the account, a transition probability between nodes in the remaining account sets obtained by subtracting the candidate node set from the account set, and a transition probability from a node in the remaining account sets to a node in the candidate node set; and obtaining a candidate node set having a maximum influence value through iteratively estimation, and using the candidate node set having the maximum influence value as a seed node set.

An account filtering method is provided, including:

obtaining an account representing a social activity network and activity information;

constructing a hypergraph of the social activity network according to the account and the activity information, a node in the hypergraph being the account in the social activity network, and one hyperedge in the hypergraph being a set of accounts that participates in an activity of an activity type, or represent a friendship between one account and another account;

for each node, calculating a probability that another node performing a random walk along the hyperedge in the hypergraph walks to the node, and obtaining an influence value of the node in the social activity network according to the probability; and subsequently filtering a node having a maximum influence by using an iteration algorithm, to form a seed node set.

DESCRIPTION OF EMBODIMENTS

Figure 1A:
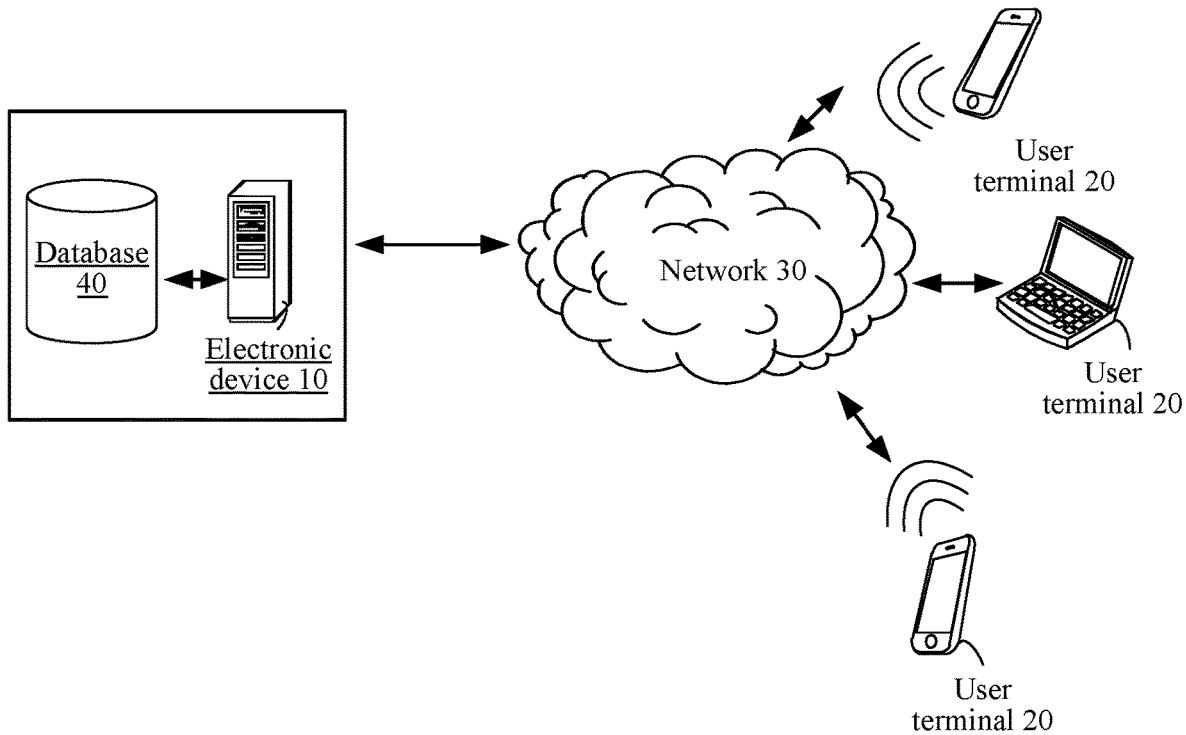
FIG. 1A is a schematic diagram of an application environment including a social media network.

To make the objectives, technical solutions, and advantages of this disclosure clearer and more comprehensible, the following further describes this disclosure in detail with reference to the accompanying drawings and embodiments.

It should be understood that the specific embodiments described herein are merely examples and are not intended to limit this disclosure.

It may be understood that, terms "first", "second" and the like used in this disclosure may be used for describing various elements, but the ordering these elements are not limited by these terms. These terms are used only to differentiate a first element and a second element. For example, without departing from the scope of this disclosure, a first client may be referred to as a second client, and similarly, the second client may be referred to as the first client. The first client and the second client may not be the same client.

To solve the influence maximization problem, the conventional implementation usually uses an independent cascade model and a linear threshold model for describing an influence spread mode in an online social network, and an influence spread process is mainly approximated by directly using a random simulation method, thereby providing an estimation of an influence range of a node set. Based on the estimation, a node set having a maximum influence is searched by a greedy algorithm designed by using a submodular characteristic. However, when this type of conventional implementation is used to filter a seed set, only an influence based on a friendship measure in the social networks is considered. Potential influences due to participation of users in various online activities such as the Hot Topic of Sina microblog, activities in discussion group of Facebook, and the like are not considered. As such, accuracy of obtaining a seed set with maximum social influence is relatively low.

In an actual social network, in addition to disseminating information by a user based on friendships, a user activity may cause information diffusion. For example, a user in a social network may establish a discussion group and a group chat; a user playing a network game may establish a team to collaborate on the game. In some scenarios, users that participate in the same activity or initiate a same activity together are more likely to have similarity. As such, information diffusion between these users based on activity participation may be more effective. Based on common existence of user activities in a social network, the embodiments of this disclosure first extend the social influence maximization problem in a conventional social network (OSN) to a social activity network (SAN). That is, the problem becomes how to describe a social influence spread model when user activities are considered. Then, to calculate influence magnitude, a model is constructed for an influence transmission process in the social activity network by using a random walk framework on a hypergraph, and a corresponding central indicator is defined in the hypergraph to represent influence magnitude of a user set in the social activity network. Finally, a Monte Carlo algorithm framework is used to quickly approximate the central indicator, and to provide a boundary condition that is satisfied by the approximation process. Two fast greedy algorithms are designed to search a user set having a maximum social influence. Embodiments of this disclosure can not only quickly and effectively approximate magnitude of social influence of a user set, but also ensure that time consumption of the algorithms is small while guaranteeing a solution of user set having a social influence equal to or close to a maximum.

A seed node filtering method and apparatus according to the embodiments of this disclosure may be exemplarily configured to apply to a scenario in which a product promotion is pushed from a backend server to a user. When the solution selects a seed user, friendship between users as well as other activities are both considered therein, so that a selected seed set tends to be more accurate. This implementation includes two steps. A first step is to select seed nodes, and the seed nodes may be selected by using calculation manner performed offline. A second step is to perform promotion by using these seed nodes. In particular, appropriate preferential promotion policy may be given to these seed nodes for promoting the seed nodes to use a new product. Afterwards, other users having relationships or association with the seed nodes may begin to purchase the product when seeing the product. In this way, a cascade effect is achieved to promote the product to a wider range.

FIG. 1A is a schematic structural diagram of an exemplary implementation environment of this disclosure. For example, the implementation environment may be a social activity network. An electronic device 10 and multiple terminal devices 20 are included, and a user may use the terminal devices 20 to perform interaction therebetween by using a communication network 30 ("network" in short). The user may use a terminal device 20 to interact with the electronic device 10. The electronic device 10 may be one or more servers. The electronic device 10 may have an independent or embedded database 40. The database 40 may store related data of each user in the social activity network.

Figure 1B:
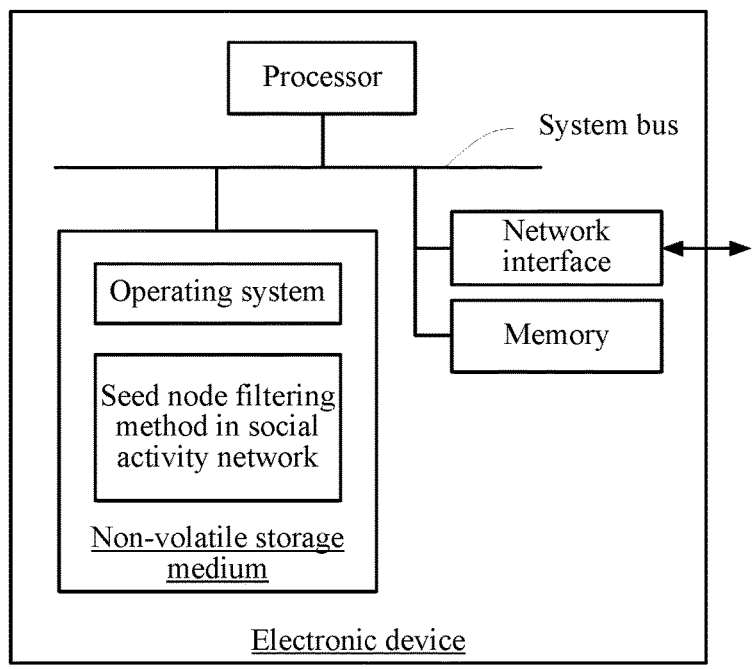
FIG. 1B is a schematic diagram of an electronic device for implementing filtering of social media user accounts.

FIG. 1B is a schematic diagram of an internal structure of an electronic device according to an embodiment. As shown in FIG. 1B, the electronic device includes a processor, a non-volatile storage medium, a memory, and a network interface that are connected by using a system bus. The non-volatile storage medium of the electronic device stores an operating system, and further includes an account filtering apparatus according to the present disclosure. The account filtering apparatus is configured to implement an account filtering method. The processor is configured to provide computing and control capabilities to support running of the entire electronic device. The memory of the electronic device provides an environment for running the account filtering apparatus in the non-volatile storage medium. The memory may store a computer readable instruction, and the computer readable instruction, when executed by the processor, may cause the processor to execute an account filtering method. The network interface is configured to perform network communications with other devices. The electronic device may be a mobile phone, a tablet computer, a personal digital assistant, a wearable device, or the like. In the structure shown in FIG. 1B, a block diagram of a partial structure related to solutions in this disclosure is only shown, and does not constitute a limit to the electronic device to which the solutions in this disclosure are applied. Specifically, the electronic device may include more components or fewer components than those shown in the figure, or some components may be combined, or a different component deployment may be used.

Figure 2:
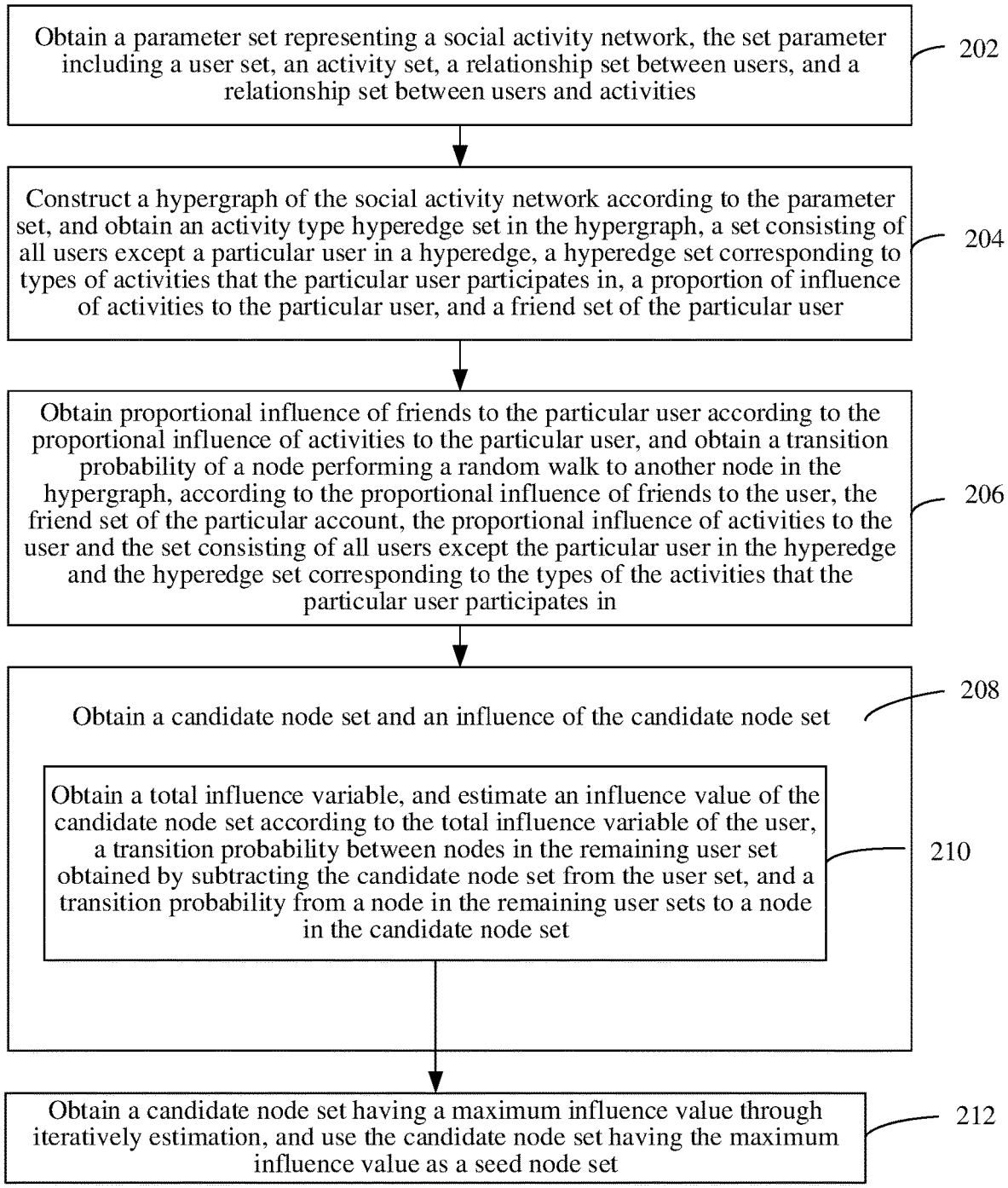
FIG. 2 is a logic flow of a user account filtering method.

FIG. 2 is a flowchart of an account filtering method according to on implementation. As shown in FIG. 2, an account filtering method is provided, including:

Step 202: Obtain a parameter set representing a social activity network, the parameter set including a user set, an activity set, a relationship set between users, and a relationship set between users and activities.

In this embodiment, the social activity network (SAN) means a network including a user relationship and a user activity relationship, and is extension to an online social network (OSN). The OSN is a platform based on Internet and can support communication of one user with other persons. Facebook and Twitter are both examples of OSN. For example, the user may hold an account registered in the social activity network. The social activity network may be embodied in a form of a web page or in a form of an application program.

The user set is refers to a group of users. The activity set refers to a collection of activities. For example, a activity set may include various user activities in the social activity network. "Activity" described in this disclosure means an organized activity that multiple persons participate in in the social network, e.g., activities by a battle team temporarily established for playing a game, and activities of a discussion group established for communication. If a user participates in the foregoing activity, the user is regarded as participate in the activity, and can generate a certain influence on a member in the activity or can be influenced by a member in a group. Further, the activities may be sorted according to different types. The relationship set between users is a set used for include relationships between the users, for example, the relationship set may include information about which users are friends to each other. The relationship set between users and activities is a set for tracking relationships between the user and the activity. Fr example, such relationship set may include information about which users participate in an activity. If a user A participates in an activity 1, a relationship set used for tracking the activity 1 may include the user A. Otherwise, if user A has not been active with respect to activity 1, the set does not include the user A. The relationship set between users and activities specifically records a group of pairs. Each pair exists in a form of (a user participating in the activity, a corresponding activity name).

The social activity network (SAN) is represented by using $G(V_0, V_1, \ldots, V_1, E_0, E_1, \ldots, E_i)$, where $V_0$ represents a user set, $V_1$ represents an $i^{th}$ type of activity set, $E_0$ represents a friendship set between users, and $E_i$ represents a relationship set between a user and an $i^{th}$ type of activity, that is, which users participate in the $i^{th}$ type of activity, where $i=1, 2, \ldots, l$. It is assumed that $N(j)$ represents a friend set of a user j. That is, $N(j)=\{i|(i,j) \in E_0\}$. $N_t(j)$ represents a set of a $t^{th}$ type of activity that a user j participates in. That is, $N_t(j)=\{a|\alpha \in V_t \ \& \ (j,a) \in E_t\}$. $N_a(j)$ is a set of users that participates in an activity a except the user j. One user represents one node.

Figure 3:
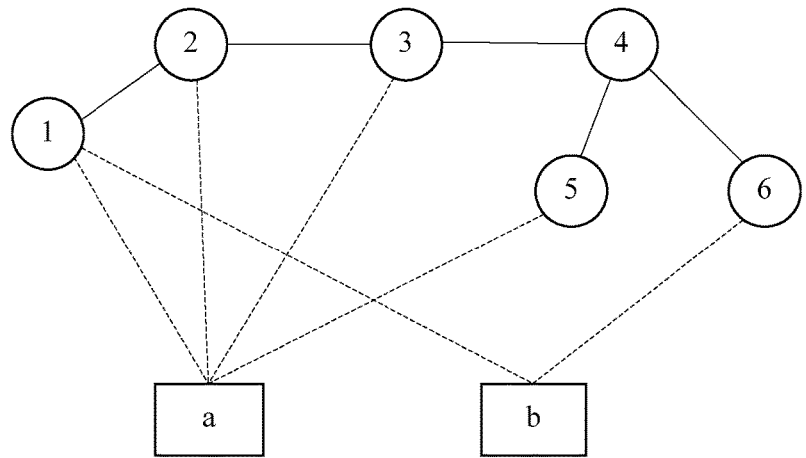
FIG. 3 is a graphical diagram of a structure of a social activity network.

A social activity network shown in FIG. 3 is used as an example, where users 1 to 6 and activities a and b are included. A solid line connection represents a friendship, and a dashed line connection represents that a user participates in a type of activity. With reference to the foregoing set definitions, it can be easily concluded that: $V_0=\{1,2,3,4,5,6\}$, $E_0=\{(1,2),(2,1),(2,3),(3,2),(3,4),(4,3),(4,5),(4,6),(5,4),(5,6)\}$, $V_1=\{a\}$, $V_2=\{b\}$, $E_1=\{(1,a), (2,a), (3,a), (5,a)\}$, $E_2=\{(1,b),(6,b)\}$. It is assumed further that j-1, $N(j)=\{2\}$, $N_t(j)=\{a,b\}$, $N_a(j)=\{2,3,5\}$.

Step 204: Construct a hypergraph of the social activity network according to the parameter set, and obtain an activity type hyperedge set in the hypergraph, a set consisting of all users except a particular user in a hyperedge, a hyperedge set corresponding to types of activities that the particular user participates in, proportional of influence (influence ratios) of activities to the particular user, and a friend set of the particular user. A vertex of the hypergraph is the user, and one hyperedge in the hypergraph is a set of users that participate in an activity of an activity type.

The hypergraph is a generalization of a graph. In the hypergraph, an edge may connect any quantity of vertex. A common graph is a specific example of a hypergraph, and the hypergraph defines a broader graph. Formally, a hypergraph H may be represented as that H=(V, E), where V is a set of elements and is referred to as a node or a vertex, and E is a group of non-null subsets of V and is referred to as a hyperedge (Hyperedge). Generally, a quantity of nodes included in E represents a degree of E, and the degree is recorded as |E| (which is greater than or equals to 2). The hypergraph may be represented in a matrix.

Figure 4:
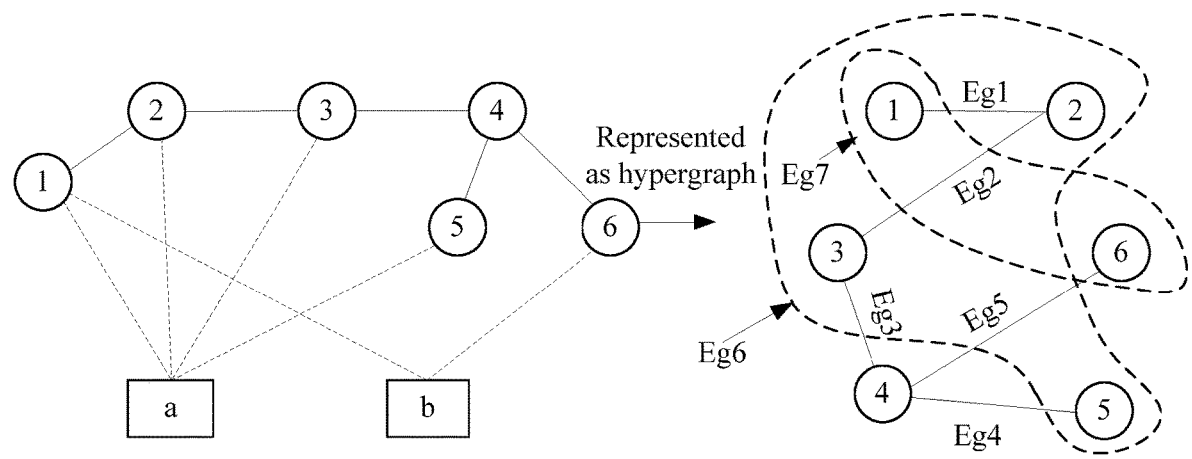
FIG. 4 illustrates conversion of a parameter set for user accounts to a hypergraph.

In one implementation, the hypergraph is used for representing a social activity network G, so that $G(V_0, V_1, \ldots, V_l, E_0, E_1, \ldots, E_l)$ may be represented as a hypergraph $G(V,E,\varepsilon_1, \ldots, \varepsilon_k)$, where $V=V_0$, $E=E_0$, $\varepsilon_i=\{(j_1, \ldots, j_k)|j_1, \ldots j_k \in V_0, (a,j_1), \ldots, (a,j_k) \in E_i, \text{ and } a \in V_i\}$. It is assumed that $M_e(j)=\{i|i \in e \ \& \ i \neq j\}$, and $\varepsilon_t(j)=\{e|e \in \varepsilon_i \ \& \ j \in \varepsilon\}$. As shown in FIG. 4, the hypergraph corresponding to FIG. 3 is $G(V,E,\varepsilon_1,\varepsilon_2)$, where $V=\{1,2,3,4,5,6\}$, $E=\{(1,2),(2,1),(2,3),(3,2),(3,4),(4,3),(4,5),(4,6),(5,4),(6,4)\}$, $\varepsilon_1=\{(1,2,3,5)\}$, and $\varepsilon_2=\{(1,6)\}$.

Here, $\varepsilon_i$ is a set of an $i^{th}$ type of hyperedges, and one hyperedge in $\varepsilon_i$ represents a set of users that participate in an activity of the $i^{th}$ type of activity. As shown in FIG. 4, $\varepsilon_1=\{(1,2,3,5)\}$, because a first type of activity has only an activity a, $\varepsilon_1$ has only one hyperedge and corresponds to the activity a.

$M_e(J)$ represents a set consisting of remaining users except the user j in a hyperedge e. As shown in FIG. 4, the activity a corresponds to the hyperedge that e=(1,2,3,5), so that $M_e(1)=\{2,3,5\}$.

$\varepsilon_t(j)$ represents a hyperedge set corresponding to a $t^{th}$ type of activity that the user j participates in. As shown in FIG. 4, if the first type of activity that a node 1 participates in is considered, $\varepsilon_1(1)=\{(1,2,3,5)\}$, and if the second type of activity that the node 1 participates in is considered, $\varepsilon_2(1)=\{(1,6)\}$. The hyperedge is a set consisting of users that participate in a particular activity. For example, (1, 2, 3, 5) represents a hyperedge consisting of users participating in the activity a.

The activity type hyperedge set is $\varepsilon_i$, a set consisting of all users except a particular user in the hyperedge is $M_e(j)$, and a hyperedge set corresponding to types of activities that the particular user participates in is $\varepsilon_t(j)$.

It is assumed that a total influence variable of a user is c (0<c<1) and the user participates in l types of activities, and it is defined at the same time that $\alpha_{jt}$ (0<$\alpha_{jt}$<1 and $\Sigma_{t=1}^{l}\alpha_{jt} \leq 1$) represents a proportional influence of a $t^{th}$ type of activities to the user j, $(1-\Sigma_{t=1}^{l}\alpha_{jt})$ represents a proportional influence of friends to the user j. Therefore, a proportional influence of activities to the user is $\alpha_{jt}$. A user friend set is N(j). In this embodiment of this disclosure, the total influence variable c may be manually set or predetermined in advance. In a real life, friends may even have no influence to each other. Therefore, c is used for representing a probability size of an influence to a user. Specifically, as c is set to be great, an influence between users is great. In contrast, a low c represents that a degree that a user has an influence to another user is low. Moreover, different types of activities may bring different potential influences, for which $\alpha_{jt}$ it is introduced count. In a specific implementation, a machine learning method may be used for learning a size of the parameter $\alpha_{jt}$. In this embodiment of this disclosure, it is assumed that influences generated by various activities are the same, that is, uniform.

Step 206: Obtain a proportional influence of friends to the user according to the proportional influence of activities to the particular user, and obtain a transition probability of a node performing a random walk to another node in the hypergraph, according to the proportional influence of friends to the particular user, the friend set of the particular account, the proportional influence of activities to the user and the set consisting of all users except the particular user in the hyperedge and the hyperedge set corresponding to the types of the activities that the particular user participates in.

In this embodiment, the random walk means, a walk is performed on and started from a specified initialized node in the hypergraph to a randomly selected neighboring node. The step is repeatedly performed unless a termination condition is satisfied.

In this embodiment of this disclosure, "termination condition" represents a case in which an influence by a node where the current random walk locates on an initialized node is sufficiently small, so that no influence may need to be considered. As proved theoretically, "termination condition" may be set as that a length of the random walk is three.

For a node i, a random walk in the hypergraph includes two steps. In a first step, a hyperedge pointing to the node i is selected. For the node i, a proportional influence from a $t^{th}$ type of activity is $\alpha_{it}$, representing a potential influence of the $t^{th}$ type of activity to a user i. For example, the user i and another user may establish a battle team for a game, the influence herein is an influence of this type of activity such as the game battle team to the user i. For different types of activities, influences to a user may be different. For example, for the user i, an influence of participating in the game battle team may be greater than an influence of participating in a discussion group.

In addition, influences from activities of a same type may be set as the same. Therefore, a hyperedge e belonging to the $t^{th}$ activity is selected in an $\alpha_{it}/|\varepsilon_t(i)|$ probability from starting the node i.

In a second step of the random walk, influences from users in a same activity is set to be the same, so that a node in the hyperedge e is selected in a $1/M_e(i)$ probability as a start of the next jump of the random walk. A transition probability during a process of performing the random walk may be:

$$p_{ij} = \left(1 - \sum_{t=1}^{k} \alpha_{it}\right) / |N(i)| \times 1_{\{j \in N(i)\}} + \sum_{t=1}^{k} \sum_{e \in \varepsilon_t(i)} \frac{\alpha_{it}}{|\varepsilon_t(i)|} \times \frac{1}{|M_e(i)|} \times 1_{\{j \in M_e(i)\}} \quad \text{formula (1)}$$

In formula (1), k is a quantity of types of activities, and $1_{\{j \in N(i)\}}$ represents that if the user j is a friend of the user i, its value is 1, otherwise, its value is 0. Here, $1_{\{j \in M_e(i)\}}$ represents that if the user j and the user i are both in an activity corresponding to the hyperedge e, its value is 1, otherwise, its value is 0.

The transition probability during the random walk, may be used for representing a probability that a step is used for jumping from the node i to the node j, and may represent influence magnitude of the node j on the node i.

Step 208: Obtain a candidate node set and an influence of the candidate node set.

In this embodiment, a candidate node set is defined as S, and an influence of the candidate node set S is $I(S)=\Sigma_{j\in V}h(j,S)$. If $j\notin S$, $h(j,S)=\Sigma_{i\in V}cp_{ji}h(i,S)$; or if $J\in S$, $h(j,S)=1$. In this way, the problem about how to achieve a maximum influence in a social activity network may be converted to a problem about how to search a candidate node set S consisting of k nodes in the hypergraph $G(V,E,\varepsilon_1, \ldots, \varepsilon_k)$, to enable I(S) to be maximum.

Here, h(j,S) represents an influence value of the candidate node set S on the user j, and the physical meaning is a probability that the random walk starting from the node j encounters the node in S. I(S) is a sum of influences of the candidate node set S on all nodes in a network.

When $j\in S$, h(j,S)=1, and indicating that a probability h(j,S) that a random walk starting from the node j encounters the node in S is 1, or indicating that when $j\in S$, the node j is an influenced node, so that an influence value of S to the node j is 1.

$cp_{ji}h(i,S)$ is a recursion expression, and after the expression is expanded, an infinite number of terms are added to each other, but the expression converges.

It should be noted that, the candidate node set S may be used as a central indicator of influence magnitude.

According to this embodiment of this disclosure, step 208 may include step 210. Step 210: Obtain a total influence variable, and estimate an influence value of the candidate node set according to the total influence variable of the user, a transition probability between nodes in the remaining user set obtained by subtracting the candidate node set from the user set, and a transition probability from a node in the remaining user sets to a node in the candidate node set.

In this embodiment, a Monte Carlo algorithm framework is used for approximating the influence value of the candidate node set. That is, I(S) is approximated using Monte Carlo algorithm. Further, h(j,S) is approximated using Monte Carlo algorithm. It can be obtained through simple deduction from the definition of h(j,S) that: when $\notin S$, $h(j,S)=ce_j^T (I-c\bar{Q})^{-1}\tilde{Q}e$, where $\bar{Q}$ represents a transition probability between nodes in (V−S) and $\tilde{Q}$ represents a transition probability from a node in (V−S) to a node in S. $e_j^T$ is transpose of a column vector $e_j$, a jth element of $e_j$ is 1, other elements of $e_j$ are 0, and T is a transpose symbol. e is the column vector, where elements are all 1. (V−S) represents a remaining user set obtained by subtracting a candidate node set from a user set. Here, S represents the candidate node set.

Step 212: Obtain a candidate node set having a maximum influence value through iteratively estimation, and use the candidate node set having the maximum influence value as a seed node set.

"Maximum influence" means that the selected seed set has a maximum influence, and it does not simply mean a set consisting of first k nodes having a maximum influence. Specifically, the seed set of nodes are determined by the social activity network. The seed node set would influence a greatest quantity of nodes.

In this embodiment, a candidate node set S consisting of k nodes is searched through iteration in a hypergraph G(V, $E,\varepsilon_1, \ldots, \varepsilon_k$), to enable I(S) to be maximum. It may be proved that the problem is a non-deterministic polynomial (NP) problem, and I(S) is a non-descending submodular function. That is, when $S\subseteq M$, $I(S)\leq I(M$ and $I(S\cup\{u\})-I(S) \geq I(M\cup\{u\})-I(M)$. According to a characteristic of the submodular function, an appropriate greedy algorithm may be designed to ensure that an obtained user set satisfies a value that is not less than an approximate ratio of $(1-1/e-\varepsilon)$ on accuracy. The term "iteration" means that, when a candidate set is S, a transmission process of influences of nodes in the set is repeatedly simulated multiple times according to a specified influence transmission model. The objective is to obtain an average influence range. The principle of the operation is based on a law of large numbers in probability statistics. That is, an average result tends to approach a true value as number of repetition grows large.

According to the foregoing account filtering method, a parameter set of a social activity network is obtained. The parameter set includes a user set, an activity set, a set of relationships between users, and a set of relationships between users and activities. When seed node filtering is performed, a user activity is considered, so that a filtered seed node is more accurate and more applicable to the social activity network.

In an embodiment, the foregoing account filtering method further includes: obtaining a weight of a first user to influence a second user, a weight of the first user to influence the second user through activities, and a weight of activities to influence the second user; and obtaining influence magnitude of the first user to the second user according to a total influence variable of the users, the weight of the first user to influence the second user, the weight of the first user to influence the second user through activities, and the weight of activities to influence the second user.

In this embodiment, in the social activity network, an influence on a user may be from a friendship, or may be from an activity relationship. It is assumed that a total influence variable of a user is c ($0<c<1$) and the user participates in l types of activities, and it is defined at the same time that $\alpha_{jt}$ ($0<\alpha_{jt}<1$ and $\Sigma_{t=1}^{l}\alpha_{jt} \leq 1$) represents a proportional influence of the $t^{th}$ type of activity to the user j, ($1-\Sigma_{t=1}^{l}\alpha_{jt}$) represents a proportional influence of a friend to the user j. For each friend i (i∈N(j)) that may influence the user j, $u_{ij}$ is defined as a weight that i exerts an influence on j, and $u_{ij}$ satisfies $\Sigma_{i \in N(j)} u_{ij} = 1$.

For the $t^{th}$ activity a that the user j participates in, a weight of a to influence j is defined as $v_{aj}$. Similarly, $v_{aj}$ satisfies $\Sigma_{a \in N_t(j)} v_{aj} = 1$. It is considered that multiple users may participate in the activity a, a weight of each user i in the activity a to influence j through the activity a is $u_{ij}^a$. Likewise, $u_{ij}^a$ satisfies $\Sigma_{a \in N_a(j)} u_{ij}^a = 1$.

For ease of description, a set in an independent cascade model is used. That is, $u_{ij}=1/|N(j)|$, $v_{aj}=1/|N_t(j)|$, and $u_{ij}^a=1/|N_a(j)|$. It should be noted that the computing framework may be easily extended to another set. Based on this set, influence magnitude of the user i on the user j may be obtained as:

$$g_{ij} = c \times \left\{ \left[ \left(1 - \sum_{t=1}^{l} \alpha_{jt}\right) \middle/ |N(j)| \times 1_{\{i \in N(j)\}} \right] + \sum_{t=1}^{l} \sum_{a \in N_t(j)} \frac{\alpha_{jt}}{|N_t(j)|} \times \frac{1}{|N_a(j)|} \times 1_{\{i \in N_a(j)\}} \right\} \quad \text{formula (2)}$$

In formula (2), $1_{\{i \in N(j)\}}$ represents that, if i is a friend of j, its value is 1, otherwise, its value is 0. $1_{\{i \in N_a(j)\}}$ represents that, if i and j both participate in the activity a, its value is 1, otherwise, its value is 0.

Specifically, the first user can be the user i, and the second user can be the user j. A weight of the first user to influence the second user may be $u_{ij}$. A weight of the first user to influence the second user through activities is $u_{ij}^a$. A weight of activities to influence the second user is $v_{aj}$. A total influence variable of the user is c. A proportional influence of friends to the user is $(1-\Sigma_{t=1}^{l}\alpha_{jt})$, and a proportional influence of activities to the user is $\alpha_{jt}$.

Figure 5:
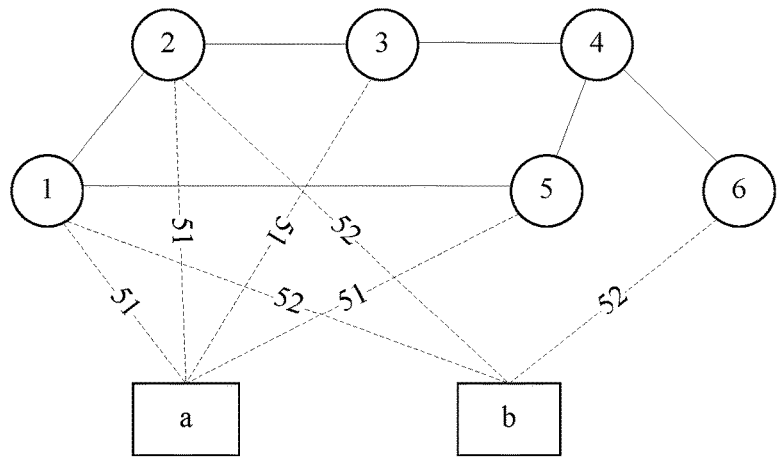
FIG. 5 is a schematic diagram showing relationship between nodes and activities of a hypergraph.

The following calculates an influence $g_{21}$ of a node 2 on a node 1 in FIG. 5 to describe the foregoing process. It is assumed that c=4/5, and $\alpha_{11}=a_{12}=1/4$, where 51 represents an activity of a first type, and 52 represents an activity of a second type. In FIG. 5, the activity of the first type that the node 1 participates in is only a, and the activity of the second type that the node 1 participates in is only b, so that $N_1(1)=\{a\}$ and $N_2(1)=\{b\}$. For activity a, in addition to the node 1, node 2, node 3, and node 5 further exist; and for activity b, in addition to the node 1, node 2, and node 6 further exist. Therefore $N_a(1)=\{2,3,5\}$ and $N_b(1)=\{2,6\}$. According to formula (2), there is:

$$g_{21} = 4/5 \times \{[(1-1/4-1/4) \times 1/2] + (1/4 \times 1/1 \times 1/3 + 1/4 \times 1/1 \times 1/2)\}$$

where $(1-1/4-1/4) \times 1/2$ is an influence of a friendship, $1/4 \times 1/1 \times 1/3$ is an influence of an activity a relationship, $1/4 \times 1/1 \times 1/2$ is an influence of an activity b relationship.

In some implementations, the step of obtaining a total influence variable of a user, and according to the total influence variable of the user, a transition probability between nodes in a remaining user set obtained by subtracting a candidate node set from a user set, and a transition probability from a node in the remaining user set to a node in the candidate node set, estimating an influence value of the candidate node set includes: i) obtaining the total influence variable of the user, and constructing a polynomial of the influence value of the candidate node set to the selected node according to the total influence variable of the user, a transition probability between nodes in a remaining user set obtained by subtracting a candidate node set from a user set, and a transition probability from a node in the remaining user set to a node in the candidate node set; and ii) obtaining first L terms of the polynomial, and estimating the influence value of the candidate node set by using the first L terms of the polynomial, a difference between the polynomial and the first L terms of the polynomial satisfying a preset range, and L being a natural number.

In this embodiment, if j∈S, $h(j,S)=ce_j^T(I-c\bar{Q})^{-1}Qe$, where $\bar{Q}$ represents a transition probability between nodes in (V−S), and $Q$ represents a transition probability from a node in (V−S) to a node in S. After being expanded, $h(j,S) = ce_j^T Q e + c^2 e_j^T \bar{Q} Q e + \ldots + c^L e_j^T \bar{Q}^{L-1} Q e + \ldots$. $0<c<1$ and $e_j^T \bar{Q}^n Q e \leq 1$, a sum of first L terms $h^L(S)$ of $h(j,S)$ is used for approximating $h(j,S)$, and a boundary value that a value of approximation satisfies is $0<h(j,S)-h^L(j,S)<c^{L+1}/(1-c)$. That is, a difference between the polynomial and first L terms of the polynomial is in a preset range. For considering L steps of a random walk starting from j in the hypergraph $G(V,E,\varepsilon_1, \ldots, \varepsilon_k)$, in each step of the random walk, when the random walk locates at a node k, i may be selected as a starting point of a next step at a probability of $P_{ki}$, and when the node in S is encountered, the random walk stops. Let j' represent a node at which a $t^{th}$ step of the random walk locates and define: if j'∈S, X (t)=1; otherwise, X(t)=0. X(t)=1 represents that the node at which the $t^{th}$ step locates belongs to a candidate node set S, and X(t)=0 represents that the node at which the $t^{th}$ step locates does not belong to the candidate node set S. Therefore, it may be obtained that $h(j,S)=cE[X(1)]+c^2E[X(2)]+ \ldots +c^L E[X(L)]$. To calculate $h^L(j,S)$, R random walks may be performed starting from j, and locations of the $t^{th}$ step of the R random walks are separately represented as $j_1^t, j_2^t, \ldots, j_R^t$, so that a $t^{th}$ term in $h^L(j,S)$ may be approximated as $c^t E[X(t)]=c^t \Sigma_{r=1}^{R} X_r^t/R$. Let $\hat{h}^L(j,S)=c\Sigma_{r=1}^{R} X_r^1/R + c^2 \Sigma_{r=1}^{R} X_r^2/R + \ldots + c^L \Sigma_{r=1}^{R} X_r^L/R$, it may be proved that, $P\{|h(j,S)-\hat{h}^L(j,S)|>\varepsilon \leq 2L \exp(-2(1-c)^2 \varepsilon^2 R)$. That is, the effectiveness of this approximation can be theoretically ensured. Time complexity of $h(j,S)$ is approximated as O(RL). $X_r^t$ represents whether a node at which the $t^{th}$ step of a random walk for a $r^{th}$ quantity locates belongs to a candidate node set S, and if the node belongs to S, $X_r^t$ has a value of 1, otherwise, its value is 0.

Figure 6:
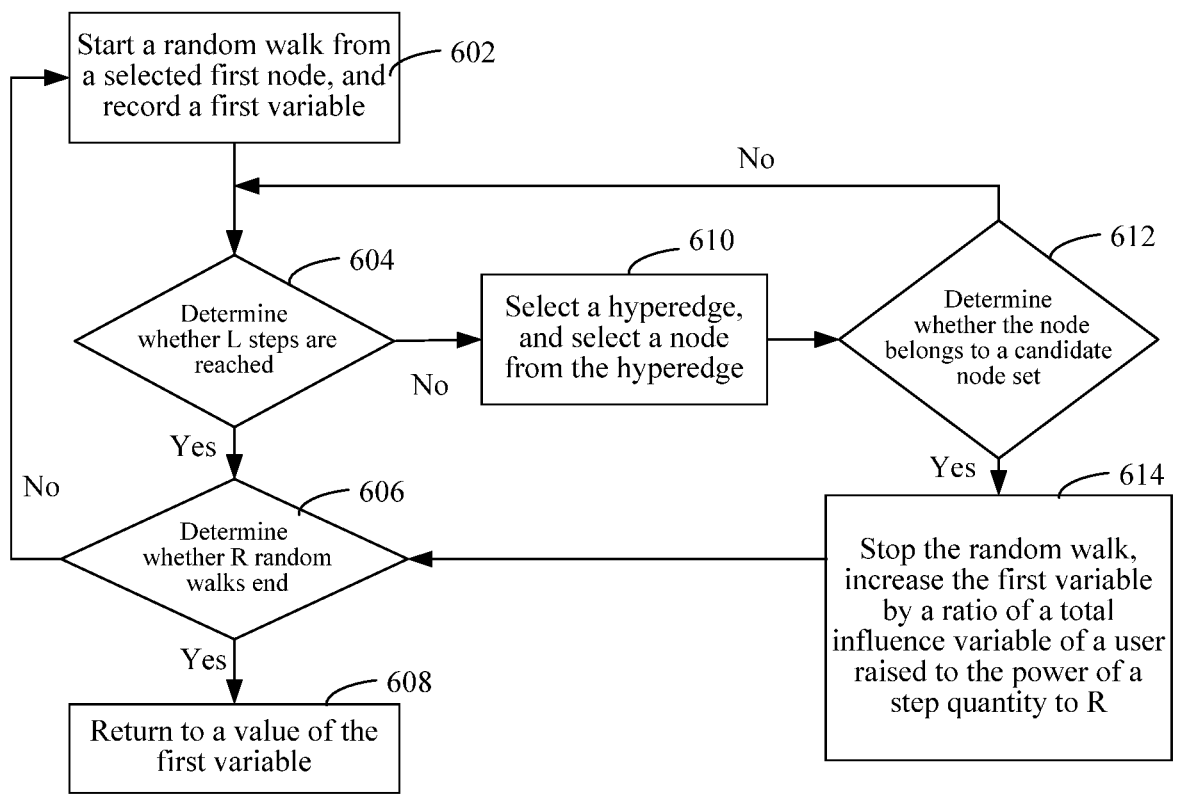
FIG. 6 is a logic flow for estimating an influence value of a candidate node set by using first L terms of a polynomial.

As shown in FIG. 6, in an embodiment, the step of estimating an influence value of a candidate node set by using first L terms of a polynomial according to an embodiment includes:

Step 602: Start a random walk from a selected first node, and record a first variable.

In this embodiment, the first variable may be represented by $\sigma$, and an initial value of $\sigma$ is 0. The value of the first variable is used for representing an increment obtained through a random walk. The term "increment" means an increment based on the first variable. The physical meaning of the first variable is to represent an influence that a current selected set has, and the influence is obtained through calculation by using the foregoing defined influence formula.

Step 604: Determine whether L steps are reached, and if yes, perform step 606, otherwise, perform step 610.

Specifically, L is a natural number, that is, first L terms of a polynomial, and is the maximum walk step quantity.

Step 606: Determine whether R random walks end, and if yes, perform step 608, otherwise, perform step 602. In this embodiment of this disclosure, for example, a value of R is set through a theoretical deduction, and is calculated by satisfying a certain amount of error. For example, R is a value greater than or equaling to 100.

Specifically, R is a natural number that is used for representing times of the random walk.

Step 608: Return to a value of the first variable.

Step 610: Select a hyperedge, select a node from the hyperedge, and perform again step 612.

Step 612: Determine whether the node belongs to a candidate node set, and if yes, perform step 614, otherwise, perform step 604.

Specifically, whether the node belongs to the candidate node set, and if it belongs to the candidate node set, stops the random walk, otherwise, still perform the random walk.

Step 614: Stop the random walk, increase the first variable by a ratio of a total influence variable of a user raised to the power of a step quantity to R, and perform again step 606.

Specifically, for each time, if a node belonging to a candidate node set is encountered, the first variable is increased by a corresponding increment. That is, $\sigma = \sigma + c^t/R$.

In this embodiment, an influence value of a candidate node set is approximated by selecting a node for performing a random walk, so that calculation is simplified, and calculation time is reduced.

In an embodiment, the step of obtaining a candidate node set having a maximum influence value through iteratively estimation, and using the candidate node set having the maximum influence value as a seed node set includes: obtaining a candidate node having a maximum influence value through iteratively estimation by using a greedy algorithm, and updating an increment of an influence of each candidate node in the candidate node set relative to the candidate node set after each iteration; and recording a track of a random walk in the first iteration, performing iterative reuse on remaining (k−1) iterations by using the track of the random walk of the first iteration, k being a quantity of seed nodes.

In this embodiment, according to an increment expression $\Delta(u) = [1 - \Sigma_{h=1}^{\infty} c^h P(u,S,h)] \times [1 + \Sigma_{j \in V-S \cup \{u\}} \Sigma_{h=1}^{\infty} c^h P^S(j,\{u\},h)]$, after each iteration ends, an updating operation of increments of influences I(S) of all candidate nodes relative to a candidate node set may be performed at the same. P(u,S,h) represents a probability that a random walk starting from u encounters a node in S at a $h^{th}$ step. Here, $P^S(j,\{u\},h)$ represents a probability that a random walk starting from j encounters a node in $\{u\}$ at a $h^{th}$ step, and it is ensured at the same time that the random walk does not pass through the node in the candidate node set S.

The track of the random walk in the first iteration is recorded for reusing for the remaining (k−1) iterations. In this way, updating operations of (k−1) iterations are all performed based on a track record of the random walk of the first iteration, and the random walk does not need to be restarted. Therefore, only O(nR) random walks are needed, and total time complexity is reduced to O(nRL).

Figure 7:
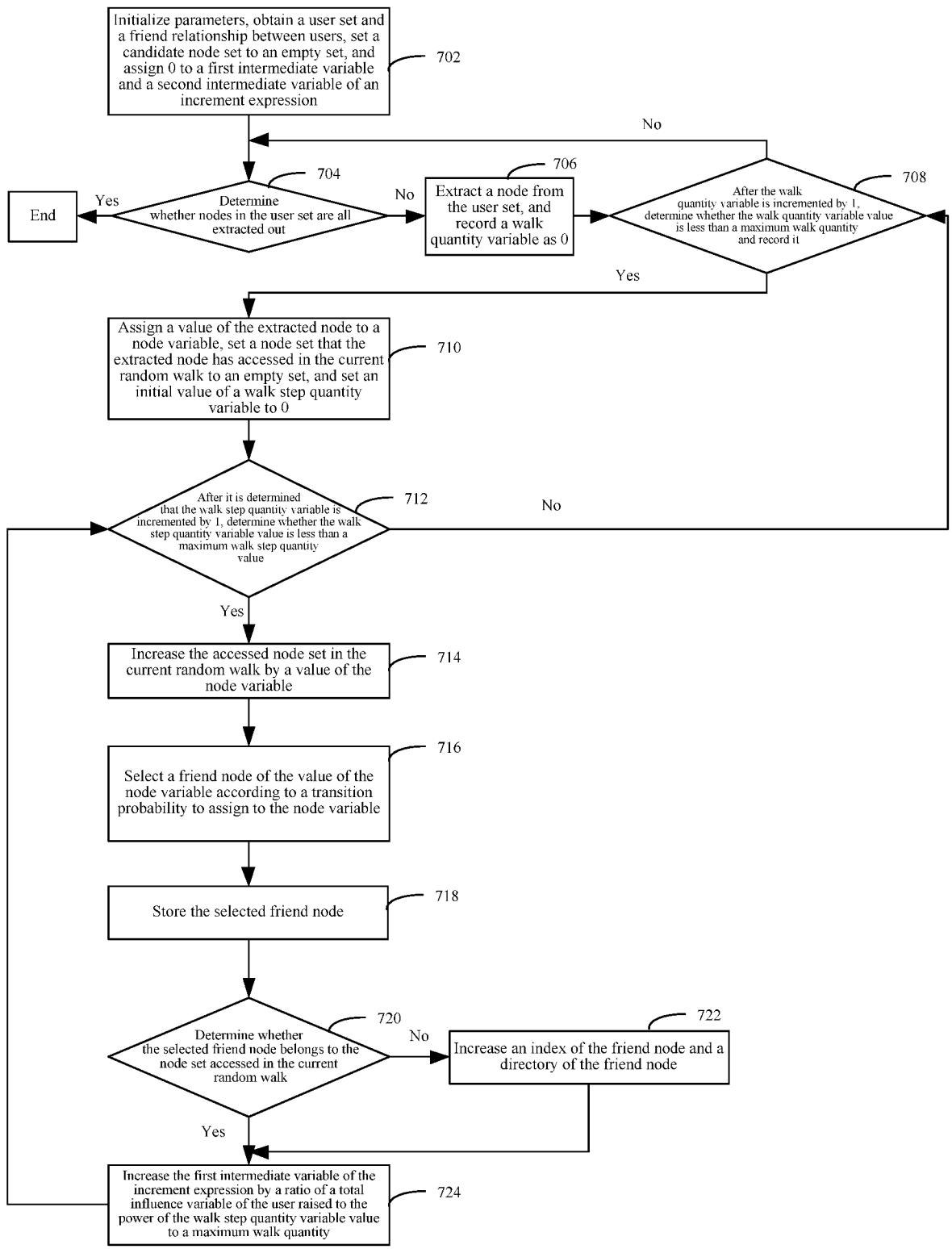
FIG. 7 is a logic flow for recording track information of a random walk.

In an embodiment, as shown in FIG. 7, the step of recording track information of a random walk includes:

Step 702: Initialize parameters, obtain a user set and a friendship between users, set a candidate node set to an empty set, and assign 0 to a first intermediate variable and a second intermediate variable of an increment expression.

Specifically, $G(V,E,\varepsilon_1, \ldots, \varepsilon_k)$ is defined, the candidate node set S is an empty set $\phi$, the first intermediate variable of the increment expression is Score[1 . . . n], the second intermediate variable is P[1 . . . n], Score[1 . . . n]←0 is performed, and P[1 . . . n] ←0 is performed.

Here, Score[1 . . . n] corresponds to $\Sigma_{j \in V-S \cup \{u\}} \Sigma_{h=1}^{\infty} c^h P^S(j,\{u\},h)]$ of the increment expression, and P[1 . . . n] corresponds to $\Sigma_{h=1}^{\infty} c^h P(u,S,h)$ of the increment expression.

Step 704: Determine whether nodes in the user set are all extracted out, and if yes, stop all steps, otherwise, perform step 706.

Step 706: Extract a node from the user set, and record a walk quantity variable as 0.

Specifically, after a node j is extracted from a user set V, a walk quantity variable is set to r=0.

Step 708: After the walk quantity variable is incremented by 1, determine whether the walk quantity variable value is less than a maximum walk quantity and record it, and if yes, perform step 710, otherwise, perform step 704.

Specifically, the walk quantity variable is incremented by 1, that is, r++. It is determined that r++<R, and R is the maximum walk quantity.

Step 710: Assign a value of the extracted node to a node variable, set a node set that the extracted node has accessed in this random walk to an empty set, and set an initial value of a walk step quantity variable to 0.

Specifically, a value of an extracted node j is assigned to a node variable i. visited represents an accessed node set in the current random walk. The walk step quantity variable is t=0.

Step 712: After it is determined that the walk step quantity variable is incremented by 1, determine whether the walk quantity variable value is less than a maximum walk step quantity value, and if yes, perform step 714, otherwise, perform step 708.

Step 714: Increase the accessed node set in the current random walk by a value of the node variable.

Specifically, visited←visited∪{i} is performed.

Step 716: Select a friend node of the value of the node variable according to a transition probability to assign to the node variable, and perform step 718.

Specifically, a friend node of a node variable i is selected according to a transition probability for the node variable, to serve a new value of the node variable i.

Step 718: Store the selected friend node, and perform step 720.

Specifically, RW[j][r][t] is used for storing the selected friend node, and RW[j][r][t] stores a node at which a $r^{th}$ random walk starting from a node j at a $t^{th}$ step locates.

Step 720: Determine whether the selected friend node belongs to the node set accessed in this random walk, and if yes, perform step 724, otherwise, perform step 722.

Step 722: Increase an index of the friend node and a directory of the friend node, and perform again step 724.

Specifically, an index index[i] of the friend node and a directory add[item(j,r,t)] of the friend node is increased.

Step 724: Increase the first intermediate variable of the increment expression by a ratio of a total influence variable of the user raised to the power of the walk step quantity variable value to a maximum walk quantity, and perform again step 712.

Specifically, a first intermediate variable of the increment expression is Score[i]=Score[i]+$c^t$/R. Here, c is a total influence variable of the user, t is a walk step quantity variable value, and R is a maximum walk step quantity.

Figure 8:
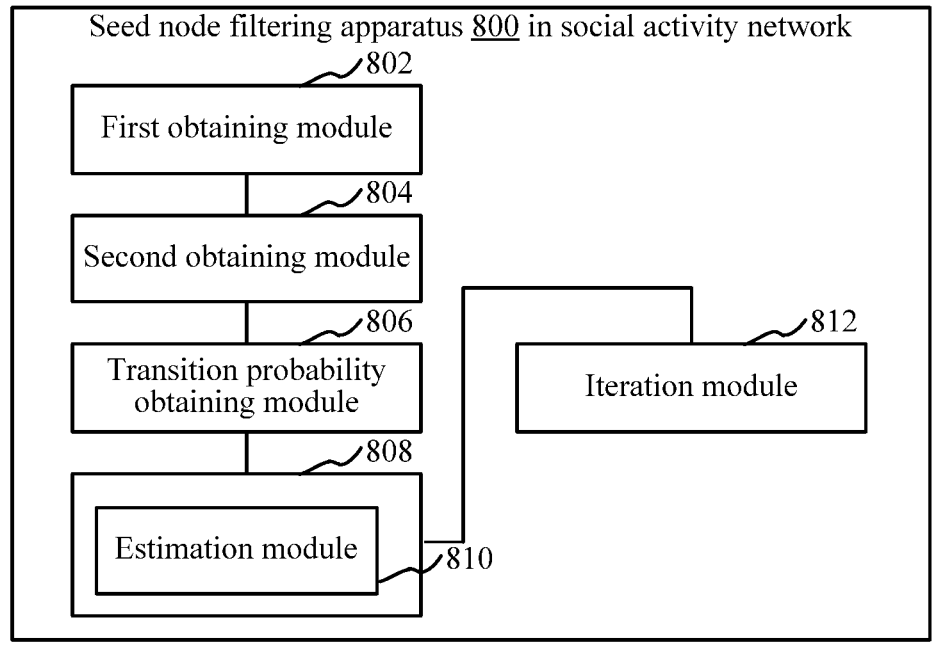
FIG. 8 is a block diagram of a user account filtering apparatus.

FIG. 8 is a structural block diagram of an account filtering apparatus according to an embodiment. As shown in FIG. 8, an account filtering apparatus 800 is provided. The account filtering apparatus 800 is a virtual apparatus formed corresponding to the method in FIG. 2, including: a first obtaining module 802, a second obtaining module 804, a transition probability obtaining module 806, an influence parameter obtaining module 808, an estimation module 810, and an iteration module 812. In the figure:

The first obtaining module 802 is configured to obtain a parameter set representing a social activity network, the parameter set including a user set, an activity set, a relationship set between users, and a relationship set between users and activities.

The second obtaining module 804 is configured to construct a hypergraph of the social activity network according to the parameter set, and obtain an activity type hyperedge set in the hypergraph, a set consisting of all users except a particular user in a hyperedge, a hyperedge set corresponding to types of activities that the particular user participates in, a proportional influence of activities to the particular user, and a friend set of the particular user.

The transition probability obtaining module 806 is configured to obtain a proportional influence of friends to the particular user according to the proportional influence of activities to a user, and obtain a transition probability of a node performing a random walk to another node in the hypergraph, according to the proportional influence of friends to a user, the friend set of the particular account, the proportional influence of activities to the particular user and the set consisting of all users except the particular user in the hyperedge and the hyperedge set corresponding to the types of the activities that the particular user participates in.

The influence parameter obtaining module 808 is configured to obtain a candidate node set and an influence of the candidate node set.

The influence parameter obtaining module 808 may include an estimation module 810, and is configured to obtain a total influence variable, and according to the total influence variable of the user, a transition probability between nodes in the remaining user set obtained by subtracting a candidate node set from the user set, and a transition probability from a node in the remaining user sets to a node in the candidate node set, estimate an influence value of the candidate node set.

The iteration module 812 is configured to obtain a candidate node set having a maximum influence value through iteratively estimation, and use the candidate node set having the maximum influence value as a seed node set.

In an embodiment, the iteration module 812 is further configured to obtain a candidate node having a maximum influence value through iteratively estimation by using a greedy algorithm, and updating an increment of an influence of each candidate node in the candidate node set relative to the candidate node set after each iteration; and recording a track of a random walk in the first iteration, and performing iterative reuse on remaining (k−1) iterations by using the track of the random walk of the first iteration, k being a quantity of seed nodes.

In an embodiment, the estimation module 810 is further configured to obtain a total influence variable of a user, and construct a polynomial of an influence value of a candidate node set to a selected node according to the total influence variable of the user, a transition probability between nodes in a remaining account set obtained by subtracting a candidate node set from the account set, and a transition probability from a node in the remaining account set to a node in the candidate node set; and obtain first L terms of the polynomial, and estimate an influence value of the candidate node set by using the first L terms of the polynomial, a difference between the polynomial and the first L terms of the polynomial satisfying a preset range, and L being a natural number.

In an embodiment, the estimation module 810 is further configured to start a random walk from a selected first node, and record a first variable;

determine whether L steps are reached, and if yes, determine whether R random walks end, and if the R random walks end, return to a value of the first variable, or if the R random walks does not end, still perform a next random walk starting from the selected first node;

if the L steps are not reached, select a hyperedge, and select a node from the hyperedge;

determine whether the node belongs to a candidate node set, and if yes, stop the random walk, increase a ratio of a first step power of a total influence variable of the user to R to the first variable, and perform again the step of determining whether the R random walks end; and if the node does not belong to the candidate node set, perform the step of determining whether L steps are performed, R being a natural number.

Figure 9:
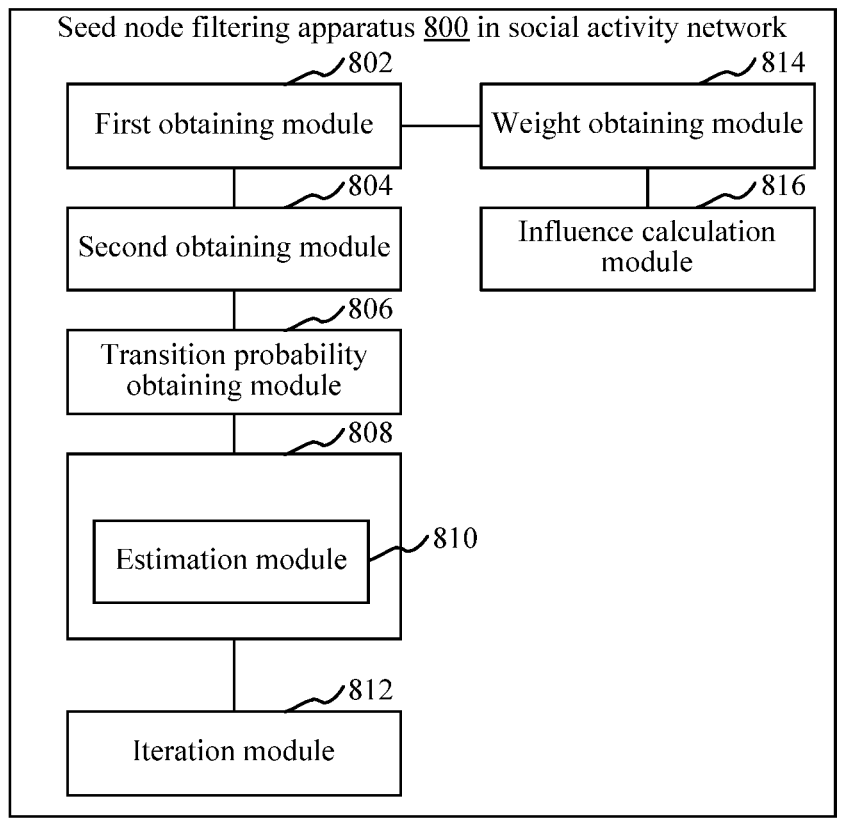
FIG. 9 is another block diagram of a user account filtering apparatus.

FIG. 9 is a structural block diagram of an account filtering apparatus according to another embodiment. As shown in FIG. 9, an account filtering apparatus 800 is provided. The account filtering apparatus 800 is a virtual apparatus formed corresponding to the method in FIG. 2, including: a first obtaining module 802, a second obtaining module 804, a transition probability obtaining module 806, an influence parameter obtaining module 808, an estimation module 810, and an iteration module 812, and further including: a weight obtaining module 814 and an influence calculation module 816. In the figure:

The weight obtaining module 814 is configured to obtain a weight that a first user exerts an influence on a second user, a weight that the first user exerts an influence through an activity on the second user, and a weight that an activity exerts an influence on the second user.

The influence calculation module 816 is configured to: according to a total influence variable of a user, a proportional influence of friends to the user, the weight of the first user to influence the second user, the weight of the first user to influence the second user through activities, and the weight of activities to influence the second user, obtain influence magnitude of the first user to the second user.

It should be noted that, in another embodiment, a user relationship generated through a user activity may be used as a common friendship for calculation.

According to the account filtering method and apparatus, a parameter set of a social activity network is obtained. The parameter set includes a user set, an activity set, a set of relationships between users, and a set of relationships between users and activities. When seed node filtering is performed, a user activity is considered, so that a filtered seed node is more accurate and more applicable to the social activity network.

According to this embodiment of this disclosure, for example, users 1 to 6 and activities a and b is shown in a social activity network shown in FIG. 3. The user 1 is a friend to the user 2; the user 2 is a friend to the user 1, and the user 3; the user 3 is a friend to the user 2, and the user 4; the user 4 is a friend to the user 3, the user 5, and the user 6; the user 5 is a friend to the user 4; and the user 6 is a friend to the user 4. The users 1, 2, 3, and 5 participate in an activity a, and the users 1, and 6 participate in an activity b. According to the hypergraph constructed in the social activity network shown in FIG. 3, as shown in FIG. 4, nodes or vertexes of the hypergraph are the users 1 to 6, and hyperedges include: a hyperedge Eg1 between a node 1, and a node 2; a hyperedge Eg2 between the node 2, and a node 3; a hyperedge Eg3 between the node 3, and a node 4; a hyperedge Eg4 between the node 4, and a node 5; a hyperedge Eg5 between the node 4, and a node 6; a hyperedge Eg6 formed by the node 1, 3, 4, and 5; and a hyperedge Eg7 formed by the node 1, and 6.

For one node in the hypergraph, a probability that another node performing a random walk along the hyperedge transfers to this node may be calculated, to obtain an influence of another node on this node. That is an influence of the node. For example, an influence of the node 2 on the node 1 is $G21=c*P_{12}$, where $P_{12}$ is a transition probability that the user 1 transfers to user 2, and c is a total influence variable.

For example, a size of a selected or predetermined seed set may be 2. That is, the selected seed set needs to include two nodes. It is assumed that S includes the selected seed set, and an initial value of the seed set is empty. A specific procedure of the greedy algorithm is: first, respectively calculating influences I({1}), I({2}), I({3}), I ({4}), I({5}), and I({6}) of all nodes in the hypergraph, and then, selecting the maximum one as a first obtained seed through filtering. Herein, it is assumed that the seed is user 1, and in this case, S={1}. When a second seed is calculated, first, I(S U {2}), I(S U {3}), I(S U {4}), I(S U {5}), and I(S U {6}) are calculated, and then, one of I(S U {2}), I(S U {3}), I(S U {4}), I(S U {5}), and I(S U {6}) whose difference with I(S) is the maximum is selected as a second seed node.

For example, when an influence I({2}) of the node 2 (S={2}) is calculated, other nodes {1, 3, 4, 5, 6} may be used as start nodes, to perform again R random walks, where a step length of each random walk is L. It is assumed that R=2, L=3 and a random walk is started from the node 5, and it is assumed that, when first repeatability is performed, a path track of the random walk is node 5-node 4-node 3-node 2 (that is, the random walk starts from the node 5, walks through the hyperedge Eg4 to the node 4, walks through the hyperedge Eg3 to the node 3, and walks through the hyperedge Eg2 to the node 2). When second repeatability is performed, a path track of the random walk is node 5-node 2 (that is, the random walk starts from the node 5, walks along the hyperedge Eg6, and reaches the node 2), I(2)=(c*c*c+c)/2, and c is a total influence variable.

Based on the foregoing method, I({1}), I({2}), I({3}), I({4}), I({5}), and I({6}) are respectively calculated, and then, the maximum one is selected as a first obtained seed through filtering. Herein, it is assumed that the seed is user 1, and in this case, S={1}. When the second seed is calculated, first, I(S U {2}), I(S U {3}), I(S U {4}), I(S U {5}), and I(S U {6}) are calculated, and then, one of I(S U {2}), I(S U {3}), I(S U {4}), I(S U {5}), and I(S U {6}) whose difference with I(S) is the maximum is selected as the second seed node.

According to the process, a node set including two nodes and having a maximum influence may be obtained through selection.

After the seed node set is filtered, nodes in the seed node set may be used for performing a commercial promotion activity in a social activity network.

With reference to an experimental design, the following describes that the account filtering method according to this disclosure has been greatly improved and has low overheads on transmission of an influence.

(1) When a user online activity is considered, a selected seed has great improvement on transmission of an influence.

Figure 10:
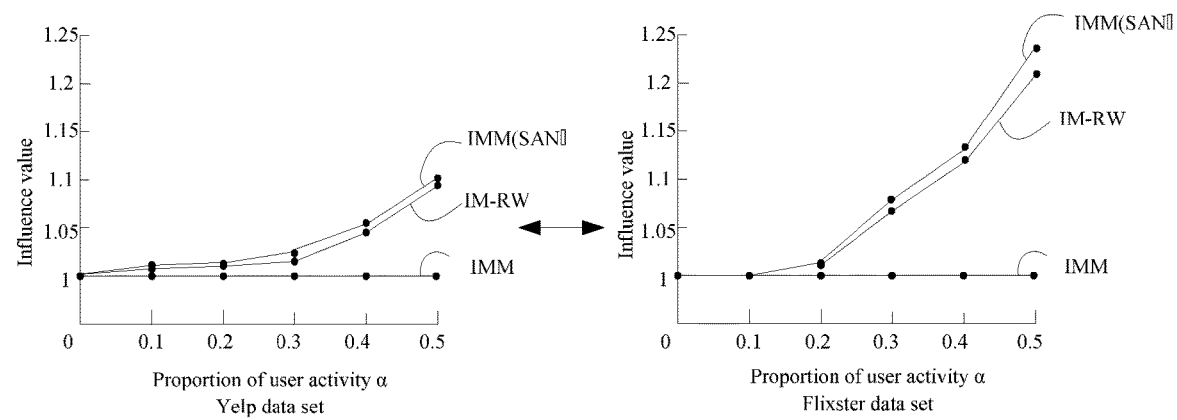
FIG. 10 illustrates impact of user online activity on influence spread.

Experimental design: in an experiment related in FIG. 10, two data sets Yelp and Flixster are used. A size of a seed set is fixed to 50. That is, 50 initial nodes are selected, and three types of algorithms are used for selecting seeds: one type is the algorithm (that is IM-RW) according to embodiments of this disclosure, another type is an interactive multi-tude model algorithm (IMM) included in the field of the problem of maximizing influence, and the last type is an extended algorithm (IMM(SAN)) of IMM in a social activity network. After seed selection ends, an expectation influence range of the seed set is estimated in such a manner that simulation is performed for multiple times for obtaining an average value, and results are respectively recorded as S(IM-RW), S(IMM), and S(IMM(SAN)). Finally, it is assumed that a horizontal coordinate α represents a proportion of a user activity, a vertical coordinate is a result standardized according to S(IMM), and the vertical coordinate represents influence magnitude after being standardized.

Experiment result analysis: From a result presented in FIG. 10, it may be learned that, if α=0, normalized influence spread values corresponding to three algorithms are the same. This is because an online activity of a user is not considered. When α gradually increases, standardized S(IM-RW) and S(IMM(SNA)) both continuously increase and the two have a small difference. It indicates that influence spread may be impacted by a user online activity, and the influence increases as a proportion of a user activity increases.

(2) A user activity is considered, time overloads of the algorithm according to embodiments of this disclosure are still small.

Figure 11:
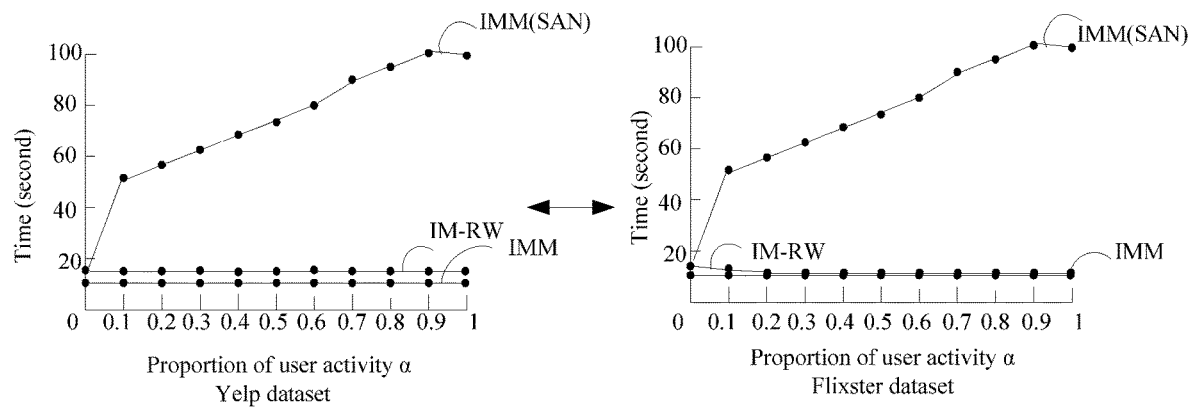
FIG. 11 illustrates improvement achieved by a user account filtering method in which user activities in the social media is considered.

Experimental design: An experimental design according to FIG. 11 is the same as that in FIG. 10. However, in this case, what the vertical coordinate measures is time overloads of the algorithm.

Experiment result analysis: it can be learned from a result shown in FIG. 11, although an IM-RW algorithm considers a user activity, time overloads of the IM-RW algorithm are almost the same as an IMM algorithm without considering the user activity, and does not change as α changes. However, compared with an IMM (SAN) algorithm with considering the user activity, time overloads of the IM-RW algorithm are greatly reduced. It is resulted from that time complexity of the IM-RW algorithm is O(nRL). That is, when R and L are determined, the IM-RW algorithm is only related to a node n of a paragraph and is not related to an edge quantity m of the paragraph, and complexity of IMM (SAN) has positive correlation of both n and m. When a proportion that a user activity is considered continuously increases, a paragraph of a social activity network continuously becomes dense, but a node quantity of the paragraph does not change. As a result, time overloads of IMM(SAN) gradually increase, and that of IM-RW remain unchanged.

All or some of the procedures of the methods of the foregoing embodiments may be implemented by a computer program instructing relevant hardware. The program may be stored in a non-volatile computer readable storage medium. When the program is executed, the program may include the procedures of the embodiments of the foregoing methods. The storage medium may be a magnetic disc, an optical disc, a read-only memory (ROM), or the like.

The foregoing embodiments only show several implementations of this disclosure as examples and are described in detail. They should not be construed as a limit to the patent scope of this disclosure. It should be noted that, a person of ordinary skill in the art may make various changes and improvements without departing from the ideas of this disclosure, which shall all fall within the protection scope of this disclosure. Therefore, the protection scope of the patent of this disclosure shall be subject to the appended claims.

What is claimed is:

1. A social media account filtering method performed by a processor in communication with a memory storing instructions, comprising:

parameterizing a social activity network to obtain a parameter set comprising a user account set, a user activity set comprising user activities belonging to at least two activity types, a friend relationship set between user accounts of the user account set, and an activity relationship set between the user accounts and the user activities, the at least two activity types being pre-established and associated with distinct user activity groups;

constructing a hypergraph data structure of the social activity network comprising nodes and hyperedges according to the parameter set, wherein the nodes correspond to the user accounts in the user account set and at least one subset of the hyperedges are of an activity type hyperedge comprising a subset of the user accounts that participate in an activity among the user activities and at least one other subset of the hyperedges are of a friend relation type hyperedge comprising a friendship relation among the friend relationship set between one user account and another user account;

obtaining an activity type hyperedge set in the hypergraph, each hyperedge in the activity type hyperedge set corresponds to one activity type of the at least two activity types;

obtaining, based on the activity type hyperedge set:
reduced user accounts sets with each reduced user account set corresponding to a particular user account and comprising user account collections each consisting of all user accounts in one activity type hyperedge except the particular user account,
user-specific activity hyperedge sets each associated with one specific user account and including activity type hyperedges corresponding to activity types of the at least two activity types that the specific user account participates in, and
friend sets of the user accounts with each set identifying a pair of user accounts having friend relationship;

quantifying connection between the nodes as random walk probabilities for performing random walks in the hypergraph, a random walk probability $p_{ij}$ from node i to node j comprising a sum of a first random walk probability based on friend relationship between the node i and the node j and a second random walk probability based on activity relationship between the node i and the node j via overlap of user activities, such that $p_{ij}=(1-\Sigma_1 A)\times B+\Sigma_2 A\times C$, wherein:
the symbols A, B, C represent proportional predetermined activity influence levels among the at least two activity types, friend relationship contribution to $p_{ij}$; activity relationship contribution to $p_{ij}$, respectively;
the sum $\Sigma_1 A$ is performed over all activity types of activities that the node i participates in, whereas the sum $\Sigma_2 A\times C$ is performed over user activities that the node i participates in and additionally over nodes in each activity hyperedge; and
B and C are determined based on the friend sets, the reduced user account sets, and the user-specific activity hyperedge sets;

generating a plurality of candidate node sets each having k nodes; for each of the plurality of candidate node sets, obtaining a total influence of the each of the plurality of the candidate node sets by:
determining a first influence of the each candidate node set on nodes within the each candidate node set as a predetermined constant multiplied by a number of nodes in the each candidate node set;
determining a second influence of the each candidate node set on nodes outside of the each candidate node set by summing influence of the each candidate node set on each of the nodes outside of the each candidate set, the influence of the each candidate node set on each of the nodes outside of the each candidate set being determined by starting from the each of nodes outside of the each candidate set and performing successive random walks using the random walk probabilities until meeting a random walk termination condition and scaling the influence of the each candidate node set on each of the nodes outside of the each candidate set using the successive random walk probabilities;
summing the first influence and the second influence to obtain the total influence of the each candidate note set; and
identifying a seed node set among the plurality of candidate sets having a maximum total influence; and automatically promoting a product linked to one node in the seed node set to other nodes of the seed node set.

2. The method according to claim 1, wherein identifying the target candidate set as the seed node set among the plurality of candidate sets having a maximum total influence comprises:

obtaining a candidate node having a maximum influence value through iterations of random walks by using a greedy algorithm, and updating an increment of an influence of each candidate node in the candidate node set relative to the candidate node set after each iteration; and recording a track of a random walk in a first iteration, and performing iterative reuse on remaining (k−1) iterations by using the track of the random walk of the first iteration, k being a predetermined number of seed nodes.

3. The method according to claim 2, wherein the second influence comprises first L terms of a polynomial representing influence of the each candidate node set, a difference between the polynomial and the first L terms of the polynomial being smaller than a preset threshold, and L being a natural number.

4. The method according to claim 3, wherein the random walk termination condition comprises either L random walks has been reached or a node among the each candidate node set is reached.

5. A social media user account filtering apparatus, comprising: a processor and a memory, and the memory storing computer readable instructions, where in the processor, when executing the instructions, is configured to:
parameterize a social activity network to obtain a parameter set comprising a user account set, a user activity set comprising user activities belonging to at least two activity types, a friend relationship set between user accounts of the user account set, and an activity relationship set between the user accounts and the user activities, the at least two activity types being pre-established and associated with distinct user activity groups;
construct a hypergraph data structure of the social activity network comprising nodes and hyperedges according to the parameter set, wherein the nodes correspond to the user accounts in the user account set and at least one subset of the hyperedges are of an activity type hyperedge comprising a subset of the user accounts that participate in an activity among the user activities and at least one other subset of the hyperedges are of a friend relation type hyperedge comprising a friendship relation among the friend relationship set between one user account and another user account;
obtain an activity type hyperedge set in the hypergraph, each hyperedge in the activity type hyperedge set corresponds to one activity type of the at least two activity types;
obtaining, based on the activity type hyperedge set:
reduced user account sets with each reduced user account set corresponding to a particular user account and comprising user account collections each consisting of all user accounts in one activity type hyperedge except the particular user account,
user-specific activity hyperedge sets each associated with one specific user account and including activity type hyperedges corresponding to activity types of the at least two activity types that the specific user account participates in, and
friend sets of the user accounts with each set identifying a pair of user accounts having friend relationship;
quantify connection between the nodes as random walk probabilities for performing random walks in the hypergraph, a random walk probability $p_{ij}$ from node i to node j comprising a sum of a first random walk probability based on friend relationship between the node i and the node j and a second random walk probability based on activity relationship between the node i and the node j via overlap of user activities, such that $p_{ij}=(1-\Sigma_1 A)\times B+\Sigma_2 A\times C$, wherein:
the symbols A, B, C represent proportional predetermined activity influence levels among the at least two activity types, friend relationship contribution to $p_{ij}$; activity relationship contribution to $p_{ij}$, respectively;
the sum $\Sigma_1 A$ is performed over all activity types that the node i participates in, whereas the sum $\Sigma_2 A\times C$ is performed over user activities that the node i participates in and over nodes in each activity hyperedge; and
B and C are determined based on the friend sets, the reduced user account sets, and the user-specific activity hyperedge sets;
generate a plurality of candidate node sets each having k nodes; for each of the plurality of candidate node sets, obtain a total influence of the each of the plurality of the candidate node sets by:
determining a first influence of the each candidate node set on nodes within the each candidate node set as a predetermined constant multiplied by a number of nodes in the each candidate node set;
determining a second influence of the each candidate node set on nodes outside of the each candidate node set by summing influence of the each candidate node set on each of the nodes outside of the each candidate set, the influence of the each candidate node set on each of the nodes outside of the each candidate set being determined by starting from the each of nodes outside of the each candidate set and performing successive random walks using the random walk probabilities until meeting a random walk termination condition and scaling the influence of the each candidate node set on each of the nodes outside of the each candidate set using the successive random walk probabilities;
summing the first influence and the second influence to obtain the total influence of the each candidate note set; and
identifying a target candidate set as a seed node set among the plurality of candidate sets having a maximum total influence; and
automatically promote a product linked to one node in the seed node set to other nodes of the seed node set.

6. The apparatus according to claim 5, wherein the processor, when executing the instruction to identify the target candidate set as the seed node set among the plurality of candidate sets having a maximum total influence, is configured to:
obtain a candidate node having a maximum influence value through iterations of random walks by using a greedy algorithm, and updating an increment of an influence of each candidate node in the candidate node set relative to the candidate node set after each iteration; and
record a track of a random walk in a first iteration, and performing iterative reuse on remaining (k−1) iterations by using the track of the random walk of the first iteration, k being a predetermined number of seed nodes.

7. The apparatus according to claim 6, wherein the second influence comprises first L terms of a polynomial representing influence of the each candidate node set,
a difference between the polynomial and the first L terms of the polynomial being smaller than a preset threshold, and L being a natural number.

8. The apparatus according to claim 7, wherein the random walk termination condition comprises either L random walks has reached or a node among the each candidate node set is reached.

9. A social media user account filtering method performed by a processor in communication with a memory storing instructions, comprising:
obtaining user accounts of a social activity network and user activity information of user activities belonging to at least two activity types, the at least two activity types being pre-established and associated with distinct user activity groups;
constructing a hypergraph of the social activity network comprising nodes and hyperedges according to the user accounts and the user activity information, wherein the nodes correspond to the user accounts, and at least one subset of the hyperedges are of an activity type hyperedge comprising a set of user accounts that participates in a user activity among the user activities having an activity type among the at least two activity types, and at least one other subset of the hyperedges are of a friend relation type hyperedge comprising a friendship relation among the friend relationship set between one user account and another user account;

for each node j in the hypergraph, calculating a probability $p_{ij}$ that another node i of the hypergraph would walk to the node j when performing a random walk along the hyperedges in the hypergraph based on both the friendship relation between the node j and node i and relationship reflecting participation of nodes in same user activities, and obtaining an influence value of the node i in the social activity network according to the probability, the friendship relation being independent of the relationship via the user activities, such that $p_{ij}=(1-\Sigma_1 A)\times B+\Sigma_2 A\times C$, wherein:

the symbols A, B, C represent proportional predetermined activity influence levels among the at least two activity types, friend relationship contribution to $p_{ij}$; activity relationship contribution to $p_{ij}$, respectively;

the sum $\Sigma_1 A$ is performed over all types of user activities that the node i participates in, whereas the sum $\Sigma_2 A\times C$ is performed over user activities that the node i participates in and over each activity hyperedge; and B and C are determined based on the friend sets, the reduced user account sets, and the user-specific activity hyperedge sets;

sequentially filtering the nodes of the hypergraph to obtain a sequence of nodes having a maximum influence by using an iteration algorithm, to form a seed node set; and automatically promoting a product linked to one node in the seed node set to other nodes of the seed node set.

10. The method according to claim 9, wherein the step of sequentially filtering nodes of the hypergraph to obtain a sequence of nodes having a maximum influence by using an iteration algorithm, to form a seed node set comprises:

obtaining a candidate node having a maximum influence value through iteratively estimation by using a greedy algorithm, and updating an increment of an influence of each candidate node in the candidate node set relative to the candidate node set after each iteration; and recording a track of a random walk in the first iteration, and performing iterative reuse on remaining (k−1) iterations by using the track of the random walk of the first iteration, k being a predetermined number of seed nodes.

11. The method according to claim 9, wherein the influence value of the node comprises first L terms of a polynomial representing influence of the node, a difference between the polynomial and the first L terms of the polynomial being smaller than a preset threshold, and L being a natural number.

12. The method according to claim 11, wherein the random walk terminates when L random walks has reached.

* * * * *

UNITED STATES PATENT AND TRADEMARK OFFICE
CERTIFICATE OF CORRECTION

PATENT NO. : 11,468,521 B2
APPLICATION NO. : 16/293109
DATED : October 11, 2022
INVENTOR(S) : Pengpeng Zhao et al.

It is certified that error appears in the above-identified patent and that said Letters Patent is hereby corrected as shown below:

In the Claims

In Column 19, Claim 1, Line 50, delete "accounts" and insert -- account --.

In Column 20, Claim 1, Lines 9-10, delete "of activities".

In Column 21, Claim 5, Line 65, delete "Care" and insert -- C are --.

Signed and Sealed this
Thirteenth Day of December, 2022

*Katherine Kelly Vidal*

Katherine Kelly Vidal
*Director of the United States Patent and Trademark Office*